(12) United States Patent
Tsai et al.

(10) Patent No.: US 7,031,152 B1
(45) Date of Patent: Apr. 18, 2006

(54) HARD DISK COMMON SUPPORT STRUCTURE

(75) Inventors: Lung-Sheng Tsai, Taipei (TW); Yi-Lung Chou, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 11/190,009

(22) Filed: Jul. 27, 2005

(30) Foreign Application Priority Data

Dec. 29, 2004  (TW) ............................... 93141132 A

(51) Int. Cl.
*G06F 1/16* (2006.01)

(52) U.S. Cl. .................... 361/685; 312/223.2; 361/727; 361/728

(58) Field of Classification Search ................. 361/685
See application file for complete search history.

(56) References Cited

U.S. PATENT DOCUMENTS

| 6,256,195 | B1 * | 7/2001 | Liao ............................. 361/685 |
| 6,317,318 | B1 * | 11/2001 | Kim ............................. 361/685 |
| 6,580,606 | B1 * | 6/2003 | Leman ......................... 361/685 |
| 6,885,551 | B1 * | 4/2005 | Chen ........................... 361/685 |
| 2004/0184231 | A1 * | 9/2004 | Chen ........................... 361/685 |

* cited by examiner

*Primary Examiner*—Lynn Feild
*Assistant Examiner*—Anthony Q. Edwards
(74) *Attorney, Agent, or Firm*—Lowe Hauptman & Berner, LLP

(57) ABSTRACT

A hard disk common support structure is disclosed, which comprises a top support frame, and a bottom support frame. The top support frame correspondingly installed above the bottom support frame, and the top support frame is receiving a top hard disk, the bottom support frame is receiving a bottom hard disk. The computer which accommodated the top support frame, the bottom support frame, the top hard disk, and the bottom hard disk can save the inside space, and different type of hard disks can be used to increase the application of the computer.

8 Claims, 3 Drawing Sheets

HARD DISK COMMON SUPPORT STRUCTURE

BACKGROUND OF THE INVENTION

1. Field of the Invention

The present invention relates to a support structure and, more particularly, to a hard disk common support structure.

2. Description of the Related Art

A typical computing device usually comprises a mother board and a hard disk. The mother board is used for circuit layout, and the hard disk is used for the reading and writing of data.

For the typical server, the hard disk is installed on the mother board; sometimes, though, the server may require more than two hard disks.

Traditionally, the above-mentioned hard disks are separately installed on both sides of the mother board, which takes up a lot of space. Moreover, the prior art hard disk requires a support frame for structural support. However, the prior art support frame can only be used for supporting one particular model of hard disk, and is not suitable for different hard disk models.

Therefore, it is desirable to provide a hard disk common support structure to mitigate and/or obviate the aforementioned problems.

SUMMARY OF THE INVENTION

The hard disk common support structure of the present invention is installed in a computer device, the computer device has a lower hard disk and an upper hard disk therein, the hard disk common support structure comprises: a bottom support frame and a top support frame a bottom support frame. The bottom support frame is installed in the computer device and comprises a top board, a first left board, and a first right board; the top board is being connected between both upper edges of the first left board and the first right board and forms a lower containing space therebetween, and the lower containing space has a first front opening and a first rear opening and is used for receiving the lower hard disk.

The top support frame is correspondingly installed above the bottom support frame, and the top support frame comprises a bottom board, a second left board, and a second right board. The bottom board is being connected between both lower edges of the second left board and the second right board and forms an upper containing space therebetween, and the upper containing space has a second front opening and a second rear opening and is used for receiving the upper hard disk.

The hard disk common support structure is further characterized in that: the first left board of the bottom support frame further comprising a fastening slot, and the second left board of the top support frame further comprising a fastening hook correspondingly hooked to the fastening slot of the bottom support frame; the upper edge of the first right board of the bottom support frame further comprising an assembly board with a lower fastening hole, and the lower edge of the second right board of the top support frame further comprising a flat board having a an upper fastening hole correspondingly secured to the lower fastening hole of the bottom support frame.

Therefore, the lower hard disk is placed in the lower containing space of the bottom support frame, the upper hard disk is placed in the upper containing space of the top support frame, and the top support frame is correspondingly installed above the bottom support frame so that the overall volume of the computer device is reduced The bottom support frame has an up-side-down U shape, and the top support frame has a U shape. The fastening slot of the bottom support frame is engaged with fastening hook of the top support frame along a forward direction.

Furthermore, the lower fastening hole of the bottom support frame is a screwed hole, the upper fastening hole of the top support frame is a through hole correspondingly secured to the screwed hole with a screw. Of course, both the lower fastening hole and the upper fastening hole can be apertures and fastened by a fastening element such as a clip.

Furthermore, the top board of the bottom support frame comprises at least one guiding hole, and the bottom board of the top support frame further comprises at least one guiding column correspondingly engaged into the at least one guiding hole. The at least one guiding hole of the bottom support frame extends along the forward direction, and the at least one guiding hole of the bottom support frame comprises a long slot which has a big round hole at its end, the at least one guiding column of the top support frame terminates with a head region, the head region is smaller than the big round hole and larger than the width of the long slot.

Wherein the computer device further comprises a lower flexible flat cable and an upper flexible flat cable, the lower flexible flat cable is corresponding to the first rear opening, and the upper flexible flat cable is corresponding to the second rear opening. The computer device further comprises a vertical circuit board having a lower connector and an upper connector, the lower connector is corresponding to the first front opening and the upper connector is corresponding to the second front opening.

Moreover, the lower hard disk can be screwed on the bottom support frame by a plurality of screws, and the upper hard disk can be screwed on the top support frame by a plurality of screws.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
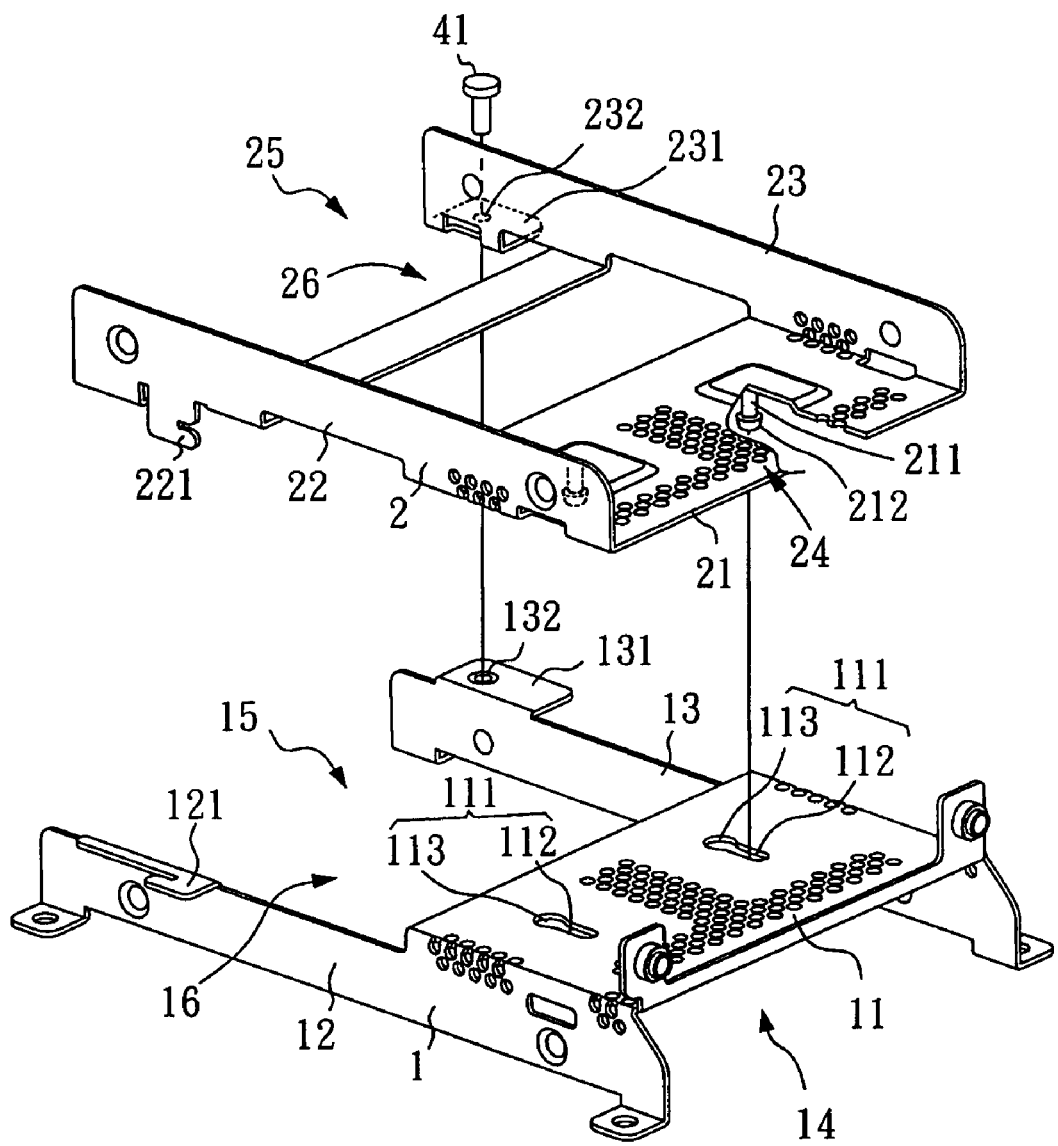
FIG. 1 is an exploded view of a first embodiment of the present invention.

Please refer to FIG. 1. FIG. 1 is an exploded view of a first embodiment of the present invention. The disk common support structure of the present invention comprises a bottom support frame 1, and a top support frame 2. The bottom support frame 1 has an up-side-down U shape and comprises a top board 11, a first left board 12, and a first right board 13. The top board 11 is connected between both upper edges of the first left board 12 and the first right board 13 and forms a lower containing space 16 therebetween. The lower containing space 16 has a first front opening 14 and a first rear opening 15. The first left board 12 of the bottom support frame 1 further comprises a fastening slot 121, wherein the fastening slot of the bottom support frame extending backwardly. The upper edge of the first right board 13 of the bottom support frame 1 further comprises an assembly board 131 with a lower fastening hole 132.

The lower fastening hole 132 of the bottom support frame 1 is a screwed hole, and the top board of the bottom support frame further comprises two guiding holes 111. Each guiding hole 111 of the bottom support frame 1 further comprises a long slot 112, which has a big round hole 113 at its end.

The top support frame 2 is correspondingly installed above the bottom support frame 1, and the top support frame 2 comprises a bottom board 21, a second left board 22, and a second right board 23. The bottom board 21 is connected between both lower edges of the second left board 22 and the second right board 23 and forms an upper containing space 26 therebetween. The upper containing space 26 has a second front opening 24 and a second rear opening 25. The second left board of the top support frame further comprises a fastening hook 221. The lower edge of the second right board 23 of the top support frame 2 further comprises a flat board 231 having an upper fastening hole 232.

The upper fastening hole 232 of the top support frame 2 is a through hole correspondingly secured to the screwed hole with a screw 41. The bottom board 21 of the top support frame 2 further comprises two guiding columns 211. Each guiding column 211 of the top support frame 2 terminates with a head region 212, the head region 212 is smaller than the big round hole 113 of the guiding hole 111, and larger than the width of the long slot 112.

Figure 2:
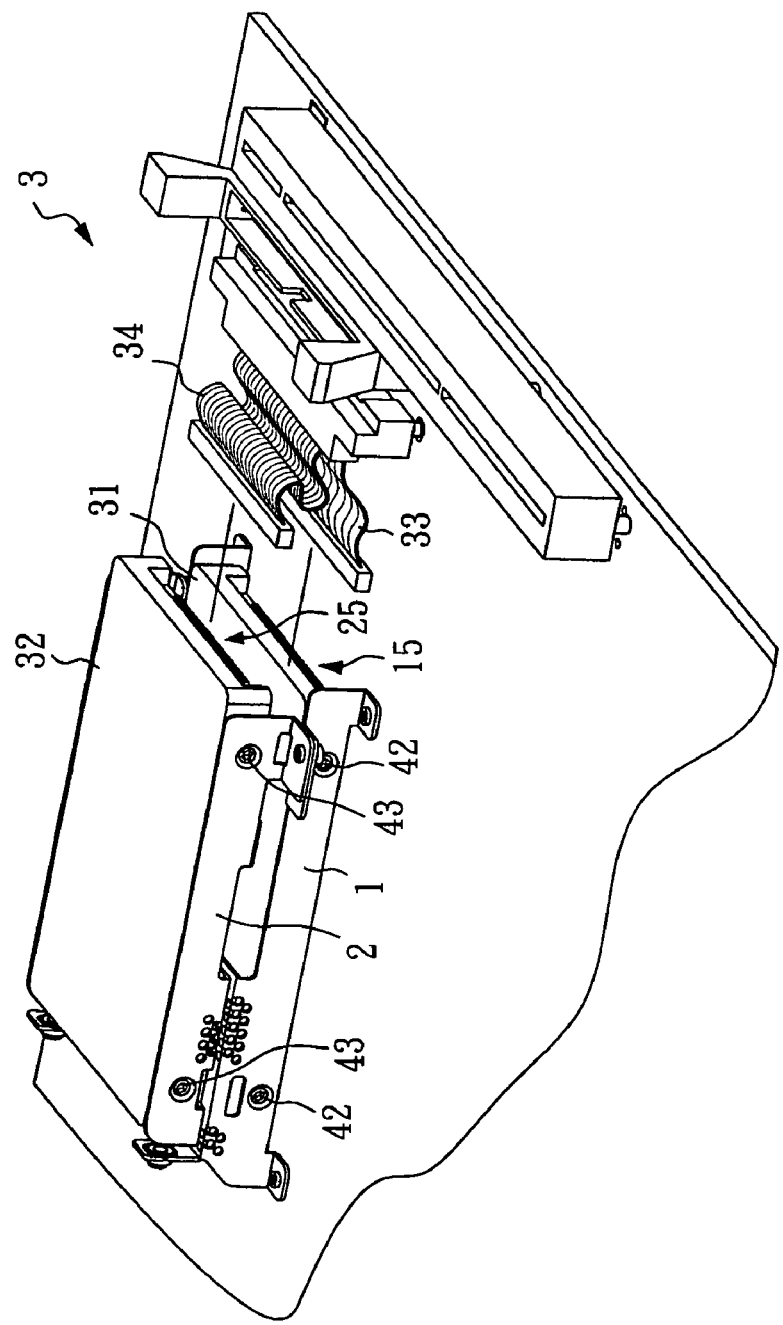
FIG. 2 is an assembly schematic drawing of a first embodiment according to the present invention.

Please refer to both FIG. 1 and FIG. 2. FIG. 2 is an assembly schematic drawing of the first embodiment according to the present invention. In FIG. 2, the bottom support frame 1 and the top support frame 2 are installed in a computer device 3. The computer device 3 comprises a lower hard disk 31, and an upper hard disk 32. The lower containing space 16 of the bottom support frame 1 is used for receiving the lower hard disk 31, and the upper containing space 26 of the top support frame 2 is used for receiving the upper hard disk 32. In this embodiment, the lower hard disk 31 is fixed in the lower containing space 16 of the bottom support frame 1 by a plurality of screws 42, and the upper hard disk 32 is also fixed in the upper containing space 26 of the bottom support frame 2 by a plurality of screws 43.

The top support frame 2 is correspondingly mounted above the bottom support frame 1; the guiding columns 211 of the bottom board 21 are inserted into each guiding hole 111 of the bottom support frame 1. Since each guiding hole 111 of the bottom support frame 1 extends along a forward direction, each guiding column 211 can slide along the forward direction of each guiding hole 111. Since each guiding hole 111 of the bottom support frame 1 further comprises a long slot 112, which has a big round hole 113 at its end, and each guiding column 211 of the top support frame 2 terminates with a head region 212, since the head region 212 is smaller than the large circular hole 113 of the guiding hole 111 and larger than the width of the long slot 112, when each guiding column 211 slides in each guiding hole 111, the head region 212 is fixed by the long slot 112 and the big round hole 113; in other words, each guiding column 211 is fixed in each guiding hole 111. When the top support frame 2 is correspondingly installed above the bottom support frame 1, the fastening hook 221 of the top support frame 2 is correspondingly fastened in the fastening slot 121 of the bottom support frame 1, and the fastening hook 221 of the top support frame 2 and the fastening slot 121 of the bottom support frame 1 are fastened together along the forward direction.

Finally, when the lower hard disk 31 is placed in the lower containing space 16 of the bottom support frame 1, and the upper hard disk 32 is placed in the upper containing space 26 of the top support frame 2, a lower flat flexible flat cable 33 of the computer device 3, at a position corresponding to the first rear opening 15, is correspondingly inserted into the lower hard disk 31, and an upper flexible flat cable 34 of the computer device 3, at a position corresponding to the second rear opening 25, is correspondingly inserted into the lower hard disk 32.

The lower hard disk 31 is placed in the lower containing space 16 of the bottom support frame 1, the upper hard disk 32 is placed in the upper containing space 26 of the top support frame 2, and the top support frame 2 is correspondingly placed above the bottom support frame 1 so that the overall volume of the computer device 3 is reduced.

Figure 3:
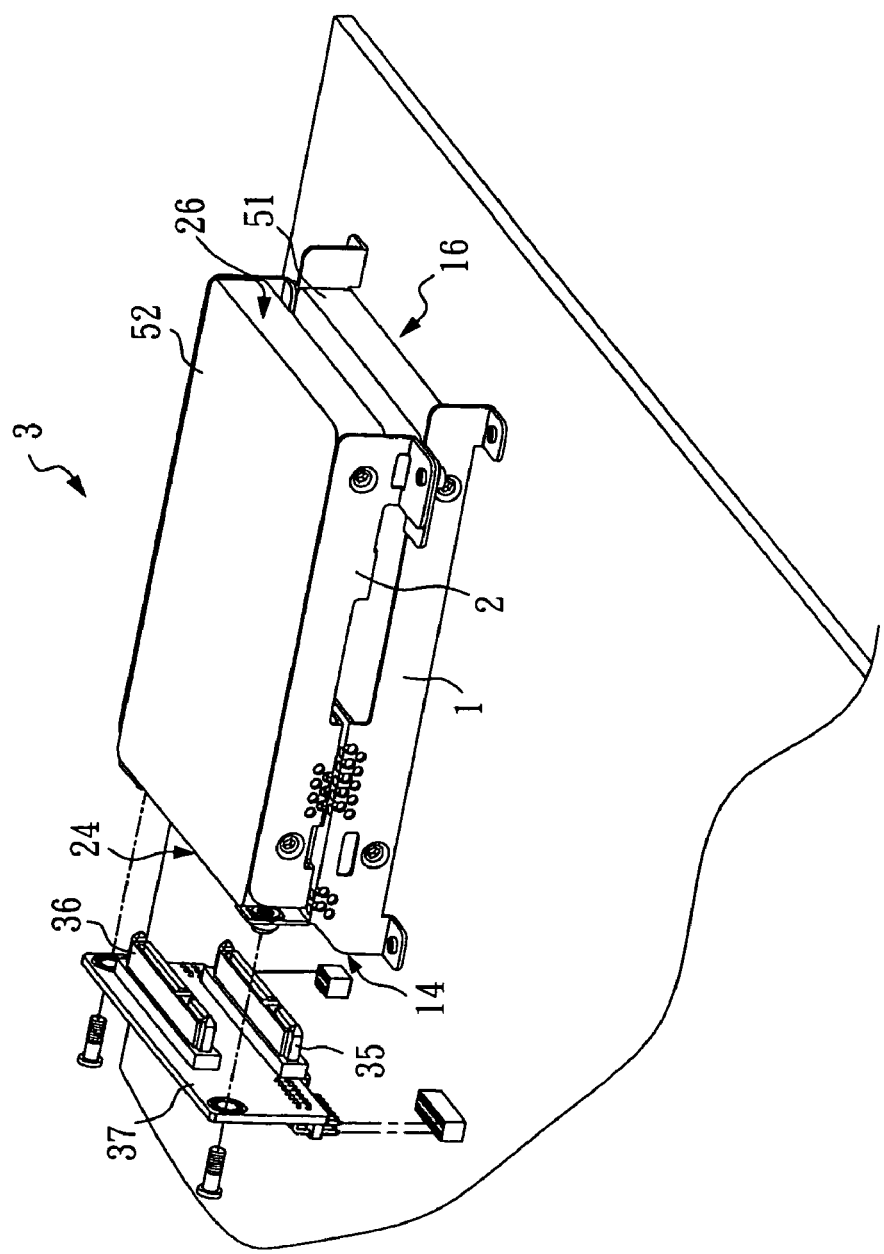
FIG. 3 is an assembly schematic drawing of a second embodiment according to the present invention.

Please refer to FIG. 3. FIG. 3 is an assembly schematic drawing of a second embodiment according to the present invention. In this embodiment, the hard disk common support structure is similar to that of the first embodiment; the only difference is that the lower containing space 16 of the bottom support frame 1 and the upper containing space 26 of the top support frame 2 are used for receiving two different types of lower hard disk 51 and upper hard disk 52. A vertical circuit board 37 of the computer device 3 has a lower connector 35 and an upper connector 36. The lower connector 35 is corresponding to the first front opening 14 and is inserted into the lower hard disk 51, and the upper connector 36 is corresponding to the second front opening 24 and is inserted into the upper hard disk 52.

Consequently, the bottom support frame 1 and the top support frame 2 can be used for receiving different types of hard disk.

Although the present invention has been explained in relation to its preferred embodiment, it is to be understood that many other possible modifications and variations can be made without departing from the spirit and scope of the invention as hereinafter claimed.

What is claimed is:

1. A hard disk common support structure installed in a computer device, the computer device having a lower hard disk and an upper hard disk therein, the hard disk common support structure comprising:

a bottom support frame installed in the computer device, the bottom support frame comprising a top board, a first left board, and a first right board; the top board being connected between both upper edges of the first left board and the first right board and forming a lower containing space therebetween, the lower containing space having a first front opening and a first rear opening and being used for receiving the lower hard disk; and a top support frame correspondingly installed above the bottom support frame, the top support frame comprising a bottom board, a second left board, and a second right board; the bottom board being connected between both lower edges of the second left board and the second right board and forming an upper containing space therebetween, the upper containing space having a second front opening and a second rear opening and being used for receiving the upper hard disk;

wherein, the first left board of the bottom support frame further comprising a fastening slot, the second left board of the top support frame further comprising a fastening hook correspondingly hooked to the fastening slot of the bottom support frame;

wherein, the upper edge of the first right board of the bottom support frame further comprising an assembly board with a lower fastening hole, the lower edge of the second right board of the top support frame further comprising a flat board having an upper fastening hole correspondingly secured to the lower fastening hole of the bottom support frame.

2. The hard disk common support structure as claimed in claim 1, wherein the fastening slot of the bottom support frame extending backwardly, the fastening hook of the top support frame correspondingly hooked to the fastening slot of the bottom support frame along a forward direction.

3. The hard disk common support structure as claimed in claim 1, wherein the lower fastening hole of the bottom support frame is a screwed hole, the upper fastening hole of the top support frame is a through hole correspondingly secured to the screwed hole with a screw.

4. The hard disk common support structure as claimed in claim 1, wherein the top board of the bottom support frame further comprises at least one guiding hole, the bottom board of the top support frame further comprises at least one guiding column correspondingly engaged into the at least one guiding hole.

5. The hard disk common support structure as claimed in claim 4, wherein the at least one guiding hole of the bottom support frame extends along the forward direction.

6. The hard disk common support structure as claimed in claim 4, wherein the at least one guiding hole of the bottom support frame comprises a long slot which has a big round hole at its end, the at least one guiding column of the top support frame terminates with a head region, the head region is smaller than the big round hole and larger than the width of the long slot.

7. The hard disk common support structure as claimed in claim 1, wherein the computer device further comprises a lower flexible flat cable and an upper flexible flat cable, the lower flexible flat cable is corresponding to the first rear opening, the upper flexible flat cable is corresponding to the second rear opening.

8. The hard disk common support structure as claimed in claim 1, wherein the computer device further comprises a vertical circuit board having a lower connector and an upper connector, the lower connector is corresponding to the first front opening, the upper connector is corresponding to the second front opening.

* * * * *